(12) United States Patent
Olsson et al.

(10) Patent No.: US 8,781,944 B2
(45) Date of Patent: Jul. 15, 2014

(54) METHOD OF MATCHING ORDERS ON AN ELECTRONIC TRADING SYSTEM AND AN ELECTRONIC TRADING SYSTEM FOR MATCHING ORDERS

(75) Inventors: Johan L. Olsson, Lidingö (SE); Daniel Jensen, Stockholm (SE); Ulf Ahlenius, Bromma (SE); Sven Ållebrand, Brooklyn, NY (US)

(73) Assignee: OMX Technology AB, Stockholm (SE)

( * ) Notice: Subject to any disclaimer, the term of this patent is extended or adjusted under 35 U.S.C. 154(b) by 1736 days.

(21) Appl. No.: 11/790,075

(22) Filed: Apr. 23, 2007

(65) Prior Publication Data

US 2008/0046354 A1 Feb. 21, 2008

Related U.S. Application Data

(60) Provisional application No. 60/813,721, filed on Jun. 15, 2006.

(51) Int. Cl.
*G06Q 40/04* (2012.01)
*G06Q 40/06* (2012.01)

(52) U.S. Cl.
CPC ............... *G06Q 40/04* (2013.01); *G06Q 40/06* (2013.01)
USPC ............................................................ 705/37

(58) Field of Classification Search
CPC ............................... G06Q 40/04; G06Q 40/06
USPC ............................................................ 705/37
See application file for complete search history.

(56) References Cited

U.S. PATENT DOCUMENTS

| | | | |
|---|---|---|---|
| 5,136,501 A | 8/1992 | Silverman et al. | |
| 6,421,653 B1 * | 7/2002 | May | 705/36 R |
| 7,231,363 B1 * | 6/2007 | Hughes et al. | 705/37 |
| 7,761,364 B2 * | 7/2010 | Wunsch et al. | 705/37 |
| 2002/0087453 A1 | 7/2002 | Nicolaisen et al. | |
| 2003/0004853 A1 * | 1/2003 | Ram et al. | 705/37 |
| 2003/0083973 A1 | 5/2003 | Horsfall | |
| 2004/0260639 A1 * | 12/2004 | Lundberg et al. | 705/37 |
| 2007/0282732 A1 * | 12/2007 | Schulman et al. | 705/37 |

OTHER PUBLICATIONS

International Search Report, ISA, Sep. 8, 2007, 3 pages.
Written Opinion of the ISA, Sep. 8, 2007, 6 pages.

* cited by examiner

*Primary Examiner* — Jessica Lemieux
(74) *Attorney, Agent, or Firm* — Nixon & Vanderhye P.C.

(57) ABSTRACT

Matching orders on an electronic trading system is disclosed. Information is broadcasted regarding the current order status of an order book of the electronic trading system The order status includes a queue of orders. An order is received to trade that selects or indicates an order in the order book having queue number two or higher. If the received order has one or more properties matching the selected order, the received order is matched with the selected order.

8 Claims, 1 Drawing Sheet

| order | User | Size | Bid | Offer | Size | User | Order |
|---|---|---|---|---|---|---|---|
| 0005 | E | 200 | 2,34 | 2.31 | 200 | B | 0002 |
| 0001 | A | 100 | 2.3 | 2.33 | 300 | C | 0003 |
| | | | | 2.34 | 200 | D | 0004 |

| order | User | Size | Bid | Offer | Size | User | Order |
|---|---|---|---|---|---|---|---|
| 0001 | A | 100 | 2.3 | 2.31 | 200 | B | 0002 |
|  |  |  |  | 2.33 | 300 | C | 0003 |
|  |  |  |  | 2.34 | 200 | D | 0004 |

| order | User | Size | Bid | Offer | Size | User | Order |
|---|---|---|---|---|---|---|---|
| 0005 | E | 200 | 2,34 | 2.31 | 200 | B | 0002 |
| 0001 | A | 100 | 2.3 | 2.33 | 300 | C | 0003 |
|  |  |  |  | 2.34 | 200 | D | 0004 |

METHOD OF MATCHING ORDERS ON AN ELECTRONIC TRADING SYSTEM AND AN ELECTRONIC TRADING SYSTEM FOR MATCHING ORDERS

This application is a new U.S. utility application claiming priority to U.S. Provisional Application No. 60/813,721 filed 15 Jun. 2006, the entire content of which is hereby incorporated by reference.

FIELD OF THE INVENTION

The present invention relates to a method for matching orders in an electronic trading system. The present invention also relates to an electronic trading system.

BACKGROUND

Electronic trading systems have become more and more popular over the years and have replaced earlier, manual, forms of trading. Especially in the financial market has the electronic trading systems become more important to provide a fair and properly working market place for trading.

In the financial market it is known to have both open and anonymous trading systems for trading in financial instruments.

The term "financial instrument" is in the present application used in a broad sense and encompasses any tradable item (stocks, bonds, securities, cash, foreign exchange, options, gas, electricity, etc.) or group of items that is traded through matching of counterparty orders (bid, offer). An order normally includes a price and a volume of the item(s) or combination of items. The price and the volume can be viewed as order prerequisites that have to be met in order for a match (deal) to take place.

In a non-anonymous trading system there is basically a queue system for unmatched orders that ascertains that the order having highest priority will have a trade whenever a matching order is received in the system. Everyone using the system can view information about who has entered which order as well as details regarding price and volume. Some open trading systems provide additional features such as privileges that enable user to "hide" their full intentions (normally volume) and add this once a match is found without loosing their place in the queue.

Although one main purpose of an anonymous trading system is to establish a fair and equal marketplace where no user or party knows the origin of any specific order (bid or offer) on the system, there is sometimes a problem for parties who do not wish to trade with specific counterparties. The most common reason for not trusting other parties is creditability, but there may be other reasons as well.

In U.S. Pat. No. 5,136,501 an anonymous trading system is disclosed where the users may enter credit requirements for counterparties via trader terminals. As long as the credit limit is not exceeded, trading can go on as usual. If the credit is exceeded, matchable orders from those parties will not be matched by the system until the credit once again is below the credit limit.

All orders thus retain their anonymity, while the parties can ascertain that no deals (trades) will be made outside a specified credit limit, thus reducing risks.

In US Patent Application 2003/0083973 an anonymous trading system having credit limit is also disclosed. The trading system can, when the credit is insufficient for fulfilling a complete order, send a message to the parties where the parties are identified and asked whether they wish to proceed with making the deal (partially or in full) or not. This can be viewed as a right to refuse a trade and will in this application be referred to as trade refusal.

Even open trading systems have problems with the above situation since the first order in the queue may be submitted by a counter-part that a user cannot or will not trade with.

There is thus a need of a versatile and easy-to-use system that allows the users of any trading system to reduce their risks but also to define their acceptable market in an individual manner.

SUMMARY

A method of matching orders in an electronic trading system is achieved through the steps of receiving an order to trade that selects an order from a queue in an order book of the electronic trading system, the selected order being number two or higher in the queue, and matching the received order with the selected order. Here, a higher queue number of course indicates a lower priority for the order. The order is essentially based first on best price (sell or buy) and secondly on time for entering the order (an earlier filed order has higher priority, i.e. lower queue number, than an order filed later).

Basically, this means that a user may pick any viewable order in the order book for trading.

In an advantageous example embodiment of the method, the selection of an order from the order book is based on information regarding the submitters of orders in the order book. This allows the user to select a preferred counterpart for a trade.

An electronic trading system comprising a matching unit and an order book achieves the sought aim in that the matching unit comprises an identifier for identifying an incoming designated order indicating a selected order in the order book, a comparator associated with the identifier for comparing the designated order and the selected order and a controller associated with the comparator for matching the designated order with the selected order, to a degree of correlation between the designated order and the selected order. Indication of a selected order can be based on one or more of submitter name, order number, queue number, price and volume.

An alternative method of matching orders in an electronic trading system is also achieved through the steps of receiving an order to trade that selects an order from a queue in an order book of the electronic trading system based on a given name of a supplier of the selected order. Here, the given name of course implies that the system is a non-anonymous trading system.

DETAILED DESCRIPTION

Figures 1, 2, 3:
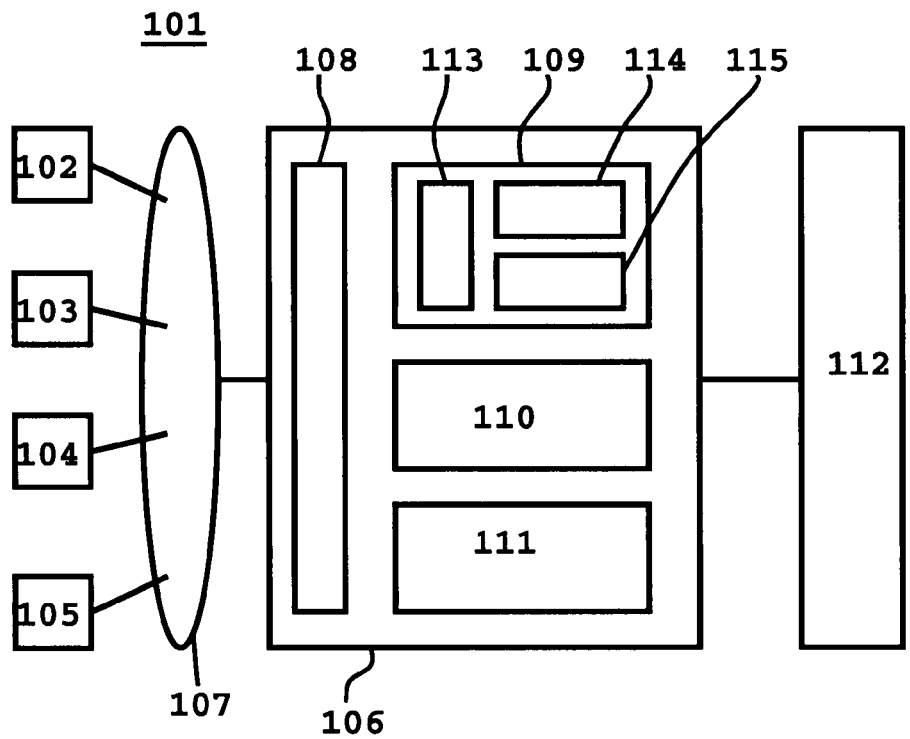
FIG. 1 is a schematic drawing of an embodiment of an electronic trading system.
FIGS. 2 and 3 show schematic renderings of an order book appearance exemplifying the method.

FIG. 1 discloses a general depicting of an electronic trading market place 101. The electronic trading market place 101 includes a number of user terminals, here represented by a first terminal 102, a second terminal 103, a third terminal 104 and a fourth terminal 105.

It may be noted that the term "terminal" here indicates any device through witch a person may enter commands and receive information (PC, laptop, palm-held devices, mobile phones, etc). Likewise, "trading computers" include any programmable device.

The terminals can communicate with an electronic trading system 106 via a communication link 107. The communication link 107 may consist of any means or combination of means of creating a signal flow, i.e. communication wires, optic fibres, Internet, Ethernet, LAN, etc.

The electronic trading system 106 is now described with reference to functional blocks rather then physical components since it can be made up of essentially any combination of hardware and software for performing the functions.

Thus, the electronic trading system 106 comprises a communication unit 108, a matching unit 109, an order book 110 and an information dissemination unit 111.

The communication unit 108 basically handles communication streams to and from the electronic trading system 106, which may include any necessary signal treatment.

The matching unit 109 is a key component to the entire trading system 106 as it carries out the procedures involved in the trading. One of the main functions for the matching unit 109 is to find matches between orders. The matching unit 109 will be described in more detail below.

The order book 110 is essentially a memory for storing information about all orders that have not found a match yet. The order book may contain separate listings for different instruments that are being traded on the electronic trading system.

The information dissemination unit 111 deals with collecting and distributing (broadcasting) relevant trading information (made trades, contents of order book 110, etc.).

Any matching orders found by the matching unit 109 are formed into a trade and forwarded to a deal capture unit 112 for finalising the trade.

The electronic trading system 106 is capable of allowing users (via the terminals 102, 103, 104, 105) to select a low-ranking order to trade with from the order book 110.

In order to provide for this, the matching unit 109 comprises an identifier 113 for checking whether an incoming order is associated with a specific trade requirement designating a specific order in the order book 110. If there is a specific order designation, the matching unit 109 will, through a comparator 114 and controller 115, check whether the specific order exists and whether it can be matched against the incoming order.

FIG. 2 and FIG. 3 further describe this process.

FIG. 2 shows, in principle, an order book status for an open market (i.e. all users can see who has placed which order). The order book status gives information about bids (left half of the order book) and offers (right half of the order book). The bid half of the order book provides (from left) order number, user, size of order (bid size) and bidding price (buy-price). The offer half of the order book similarly provides (from right) order number, user, size of order (offer size) and offer price (sell-price).

In the order book status there are four orders shown to exemplify how the orders may be depicted. Order No 0001 is a bid for a volume of 100 at a price 2.3 from user A. The meaning of this differs depending on which kind of instrument that is being traded. For instance, in a repo market it may designate that user A wishes to borrow 100 million US$ overnight at an interest of 2.3%.

The other orders present in the order book are all offers. Order No 0002 is an offer from user B to sell (or lend in ease of a repo market) 200 at 2.31, order No 0003 is an offer from user C to sell (or lend in case of a repo market) 300 at 2.33, and order No 0004 is an offer from user D to sell (or lend in case of a repo market) 200 at 2.34.

Based on this status in the order book, user E wishes to buy (borrow) 200 at best possible price (interest). However, user E is unable to trade with either of user B and user C due to limits in credibility. The best available offer is from user D, who offers 200 at 2.34.

In a conventional trading system, this would mean that user E has no option of getting the loan on this market. In accordance with the technology described herein, however, user E may send in an order for 200 at 2.34 and designate order 0004 as requested the trade counterpart.

This is indicated in FIG. 3, where the designated order from user E is given order No 0005. The designation of user D's offer is indicated by the arrow (the designation of order 0004 need not be visible in or to the order book—it is sufficient that the matching unit has that information).

It is further not necessary that the order that is directed to a specific (non-prioritised) order in the order book matches that order completely. Partial matches can also occur, whereby the remaining parts form a new order (retaining priority).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. Method of matching orders on an electronic trading system in an open trading market, including the steps of:
  non-anonymously broadcasting to market users, by electronic broadcasting circuitry, information regarding current order status of an order book of the electronic trading system including identities of parties having placed orders stored in the order book, said order status comprising a queue of orders stored in the order book, each stored order having associated properties and an associated queue number, where a higher queue number indicates a lower trading priority than a lower queue number;
  receiving, by electronic receiving circuitry, an order to trade selecting a lower priority order stored in the order book having a queue number of two or higher than a higher priority order stored in the order book having a lower queue number, said received order having properties matching both the selected order and the higher priority order;
  identifying that the received order includes information that selects the lower priority order stored in the order book; and matching, by electronic matching circuitry, the received order with the selected lower priority order stored in the order book without matching the higher priority order with the lower queue number, wherein the higher priority order remains stored in the order book after the matching.

2. Method according to claim 1, wherein the step of matching the received order with the selected order includes a partial matching, wherein a remaining part of the partially matched order forms a new order in the order book.

3. Method according to claim 1, wherein the properties matching the selected order can be based on one or more of submitter name, order number, queue number, price and volume.

4. Method according to claim 1, wherein the broadcasted order status further comprises identity information identifying each submitter of each order in the queue, and wherein the order is selected from the order book based on the identity of the submitter.

5. An open electronic trading system comprising:
   an electronic matching unit arranged to match orders submitted by users;
   a memory storing an order book associated with the matching unit and arranged to store and organize unmatched orders in queues,
   an electronic broadcasting unit arranged to non-anonymously broadcast to market users information regarding current order status of the order book including identities of parties having placed orders stored in the order book, said order status comprising a queue of orders stored in the order book, each stored order having associated properties and an associated queue number, where a higher queue number indicates a lower trading priority than a lower queue number, and
   an electronic identification unit arranged to identify that the received order includes information that selects the lower priority order stored in the order book,
   wherein the electronic matching unit includes a controller arranged to match an incoming designated order selecting a lower priority order in the order book having a queue number of two or higher than a higher priority order stored in the order book having a lower queue number with the lower priority order without matching the higher priority order with the lower queue number, wherein the higher priority order remains stored in the order book after the matching.

6. Electronic trading system of claim 5, wherein the matching unit further comprises:
   a selector for selecting a particular order in the order book, and
   a comparator for comparing one or more properties of the designated order and the particular order,
   wherein the controller is arranged to match the designated order with the particular order to a degree of correlation between the designated order and the selected order.

7. Electronic trading system according to claim 6, wherein the selecting of a particular order is based on one or more of an order submitter name, an order number, a queue number, a price, and a volume.

8. Electronic trading system according to claim 5, wherein the selecting of a particular order is based on one or more of an order submitter name, an order number, a queue number, a price, and a volume.

* * * * *